United States Patent [19]
Musha et al.

[11] Patent Number: 5,233,444
[45] Date of Patent: Aug. 3, 1993

[54] FOCUS ERROR DETECTING APPARATUS

[75] Inventors: Toru Musha; Takeshi Yamazaki, both of Tokyo, Japan

[73] Assignee: Olympus Optical Co., Ltd., Tokyo, Japan

[21] Appl. No.: 556,363

[22] Filed: Jul. 24, 1990

[30] Foreign Application Priority Data

Jul. 25, 1989 [JP] Japan ................... 1-190642
Mar. 20, 1990 [JP] Japan ................... 2-68123

[51] Int. Cl.$^5$ .......................... G02B 5/32; G11B 7/12; G01J 1/00
[52] U.S. Cl. ........................ 359/15; 359/569; 250/201.5; 369/109; 369/122
[58] Field of Search ................ 359/1, 15, 16, 17, 19, 359/27, 558, 566, 569; 250/237 G, 201.5; 369/44.11, 44.12, 44.23, 109, 112, 122

[56] References Cited

U.S. PATENT DOCUMENTS

| | | | |
|---|---|---|---|
| 4,804,835 | 2/1989 | Ando | 369/122 |
| 4,857,719 | 8/1989 | Ando | 250/201.5 |
| 4,858,215 | 8/1989 | Yano et al. | 250/201.5 |
| 4,894,815 | 1/1990 | Yamanaka | 369/112 |
| 4,945,529 | 7/1990 | Ono et al. | 369/109 |

FOREIGN PATENT DOCUMENTS

| | | | |
|---|---|---|---|
| 3534776 | 4/1986 | Fed. Rep. of Germany | 369/44.12 |
| 57013 | 5/1981 | Japan . | |
| 62-192023 | 8/1987 | Japan . | |
| 259241 | 11/1987 | Japan | 369/44.12 |
| 10325 | 1/1988 | Japan . | |
| 63-20727 | 1/1988 | Japan . | |
| 1-220133 | 9/1989 | Japan . | |
| 1-229437 | 9/1989 | Japan . | |

OTHER PUBLICATIONS

M. Hirose, et al., "Monolithically Integrated GaAlAs Laser/Detector Array", Denishi Tsushin Gakkai OQE86 1-14, vol. 86, No. 8, pp. 73-77, Apr. 1986.

*Primary Examiner*—Bruce Y. Arnold
*Assistant Examiner*—David R. Parsons
*Attorney, Agent, or Firm*—Stevens, Davis, Miller & Mosher

[57] ABSTRACT

A focus error detecting apparatus in which a light emitting and receiving element including a light emitting portion and light receiving portions all of which are formed in a common semiconductor substrate, a hologram element diffracts a light beam reflected by an object to generate plus and minus first-order diffraction light beams and to introduce an astigmatism into the plus and minus first-order diffraction light beams such that shapes of spots of the diffraction light beams formed on the light receiving portions of the light emitting and receiving element vary into substantially reverse directions to each other, and a focusing condition is detected in accordance with outputs of the light receiving portions. Therefore, in this apparatus, positioning adjustment of the light receiving portions with respect to the light emitting portion is not necessary, and thus a number of the adjusting process can be remarkably decreased and the cost for manufacturing the apparatus can be reduced. Furthermore, the focusing condition can be detected with high accuracy.

25 Claims, 19 Drawing Sheets

FIG_1 PRIOR ART
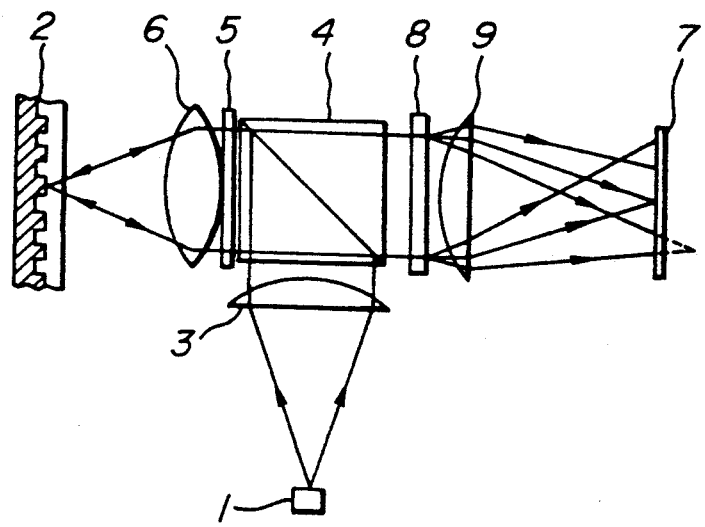
FIG_2 PRIOR ART
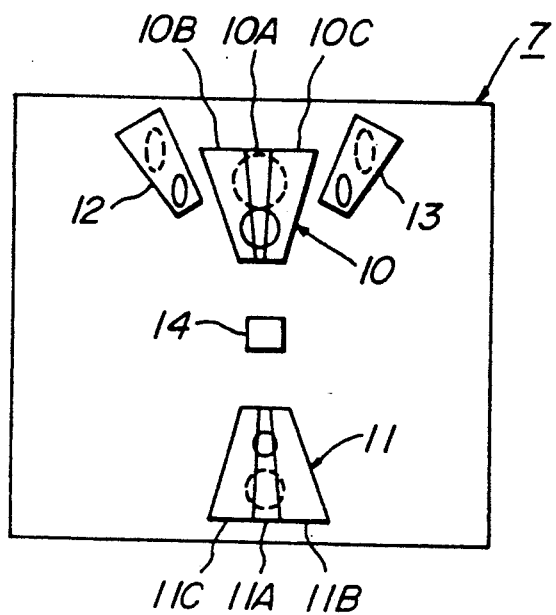

FIG_3 PRIOR ART
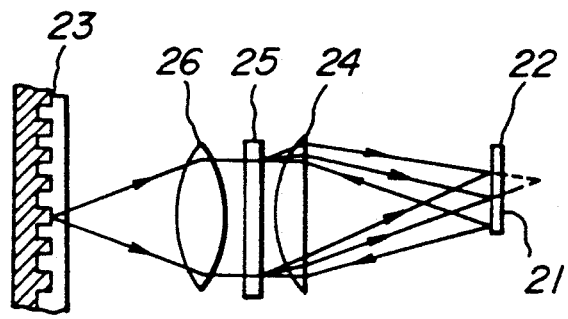
FIG_4 PRIOR ART
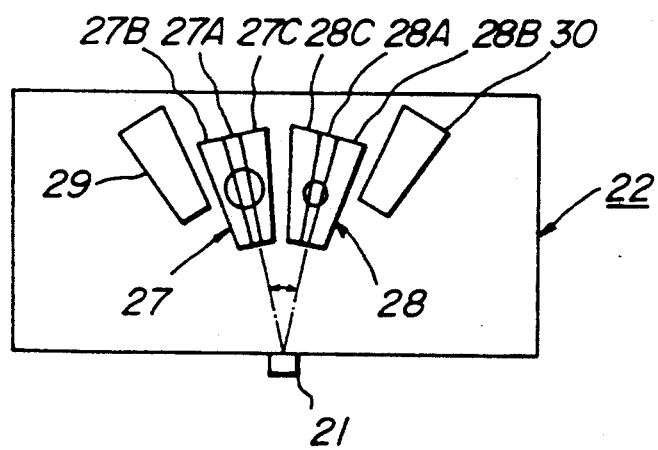

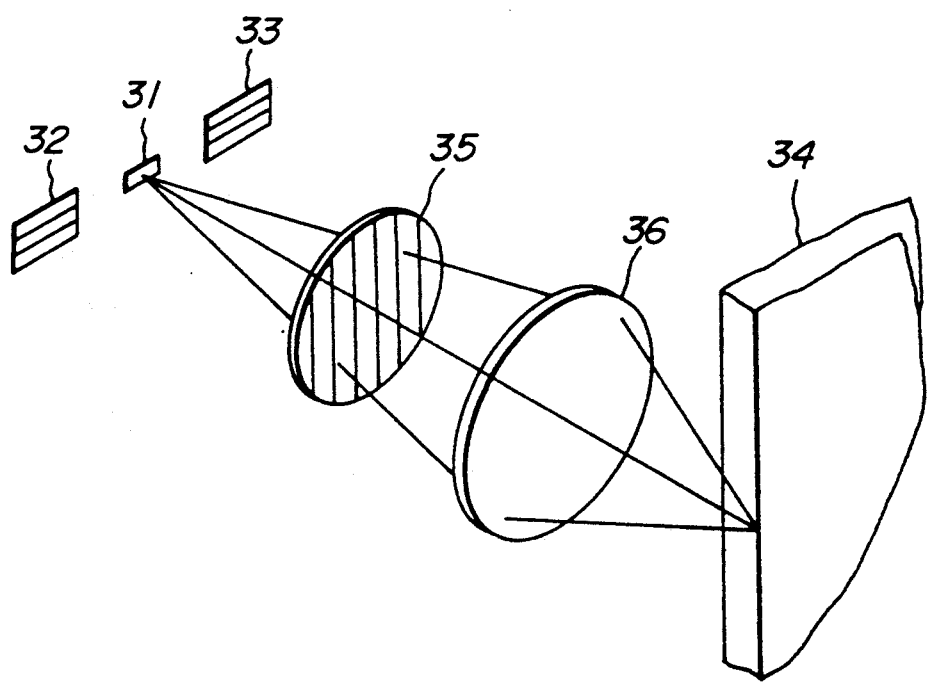
FIG_5 PRIOR ART

FIG_6 PRIOR ART
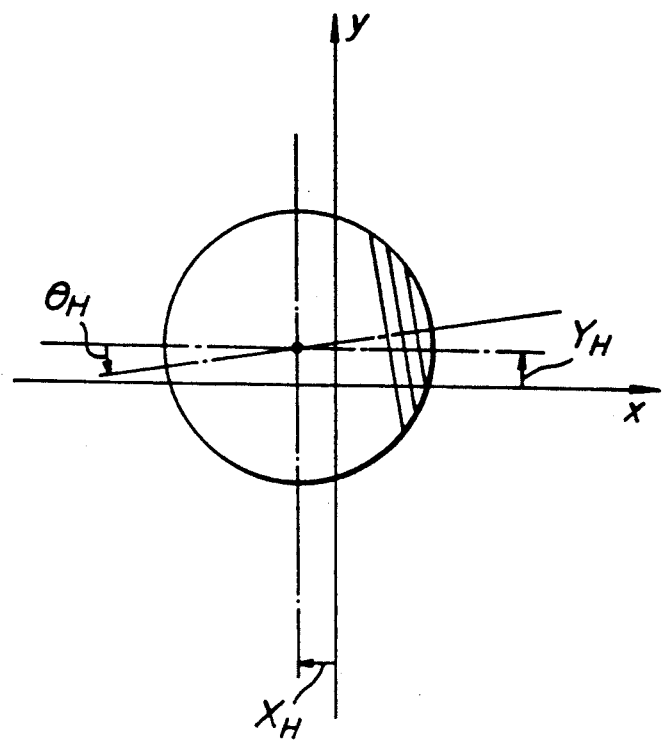
FIG_7 PRIOR ART
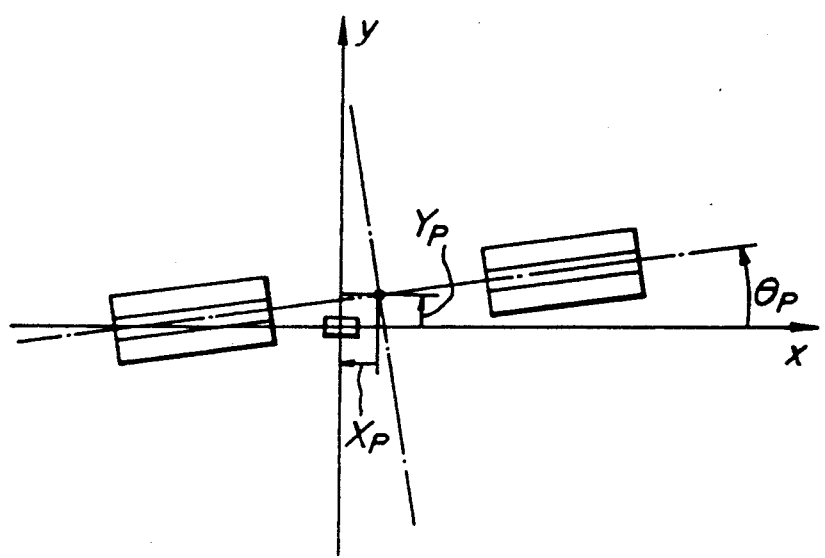

FIG_8 PRIOR ART
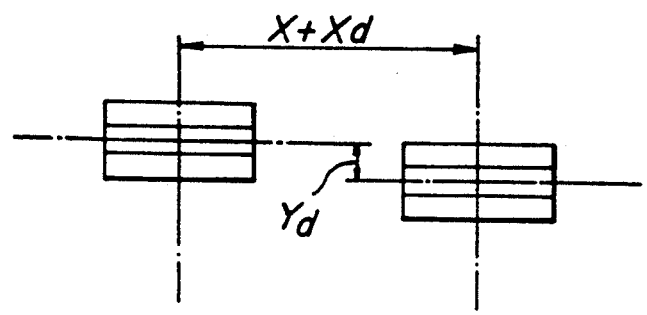
FIG_9 PRIOR ART
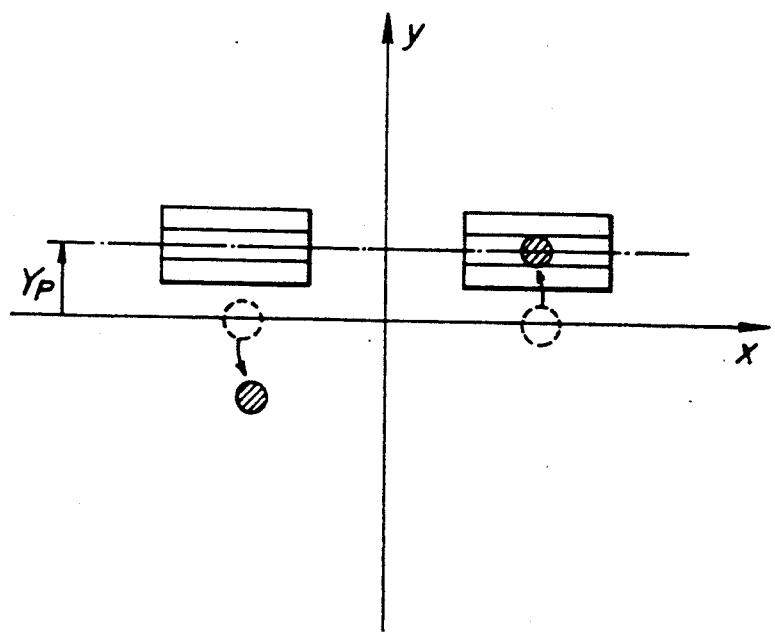

FIG_10 PRIOR ART
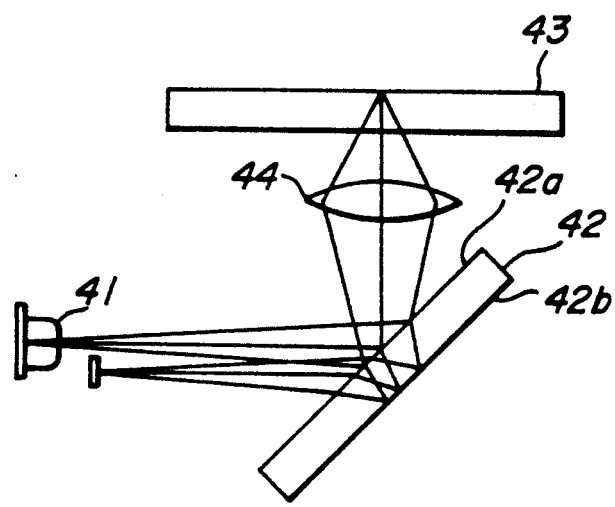
FIG_11 PRIOR ART
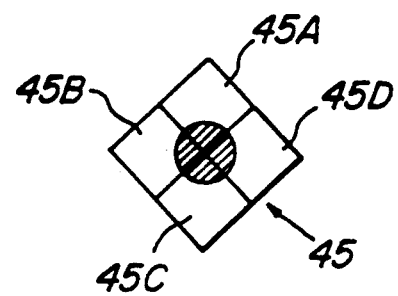

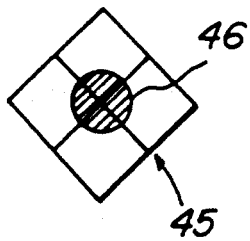
FIG_12A
PRIOR ART
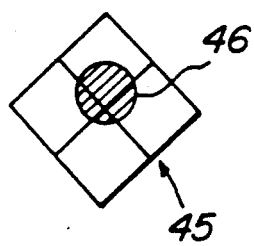
FIG_12B
PRIOR ART
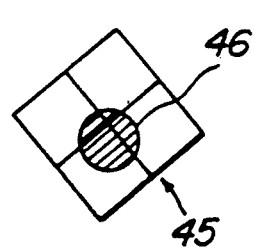
FIG_12C
PRIOR ART

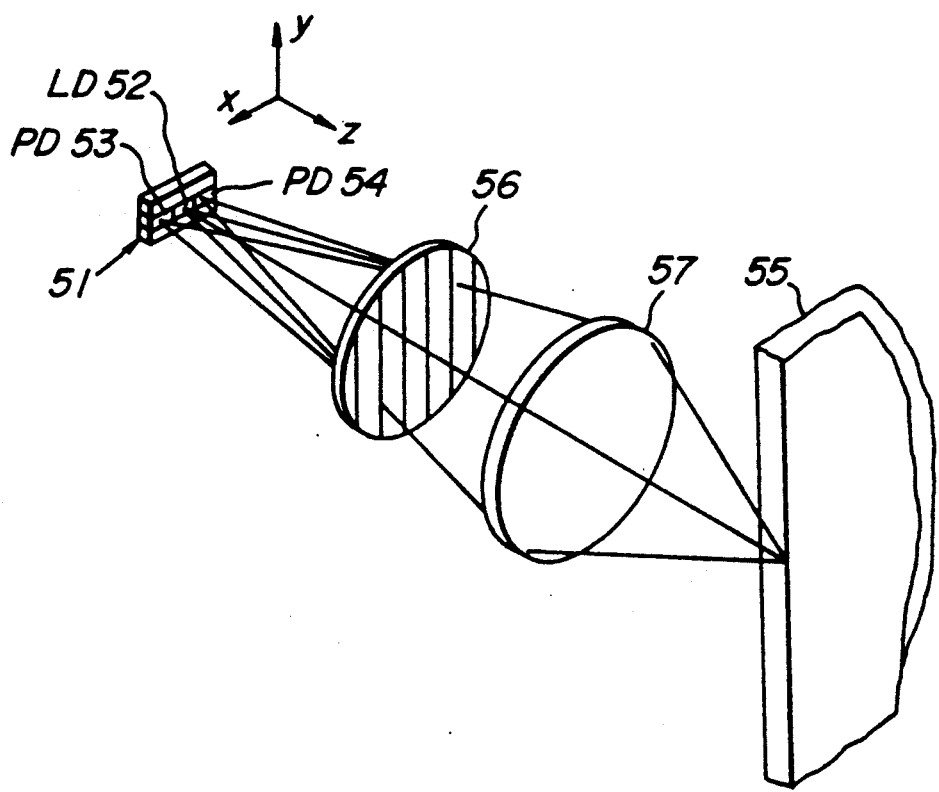
FIG_13

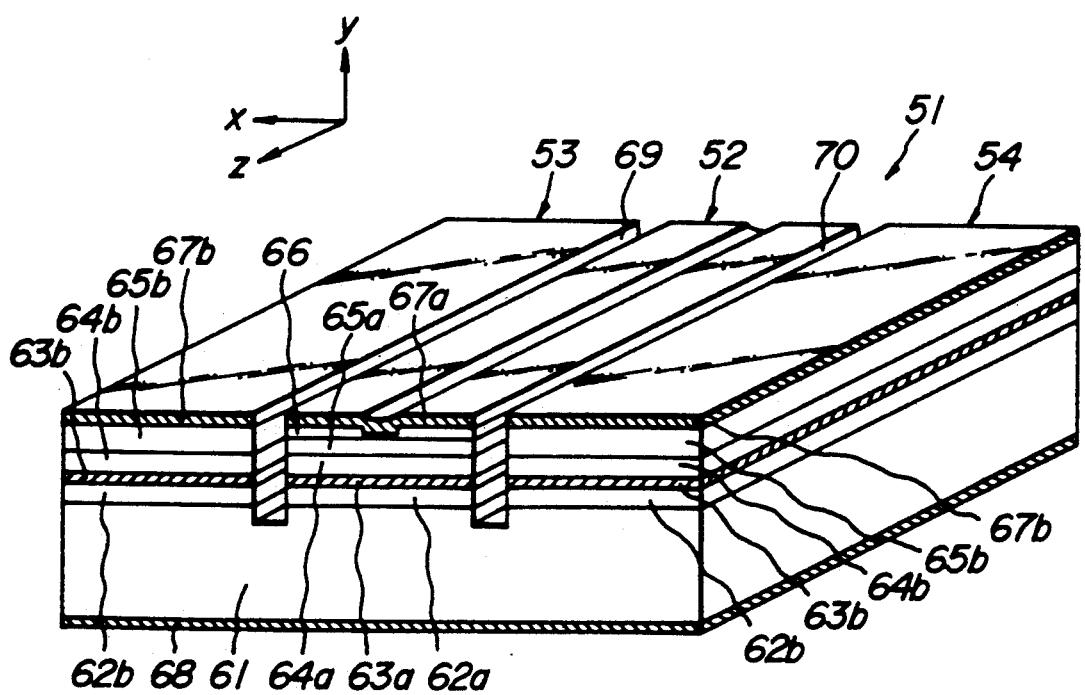
FIG_16

FIG_17
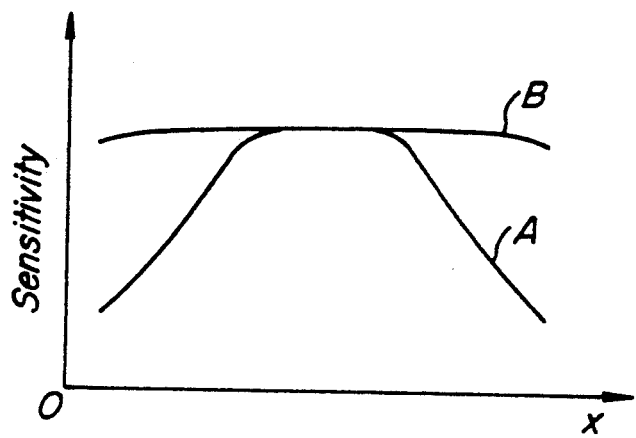
FIG_18
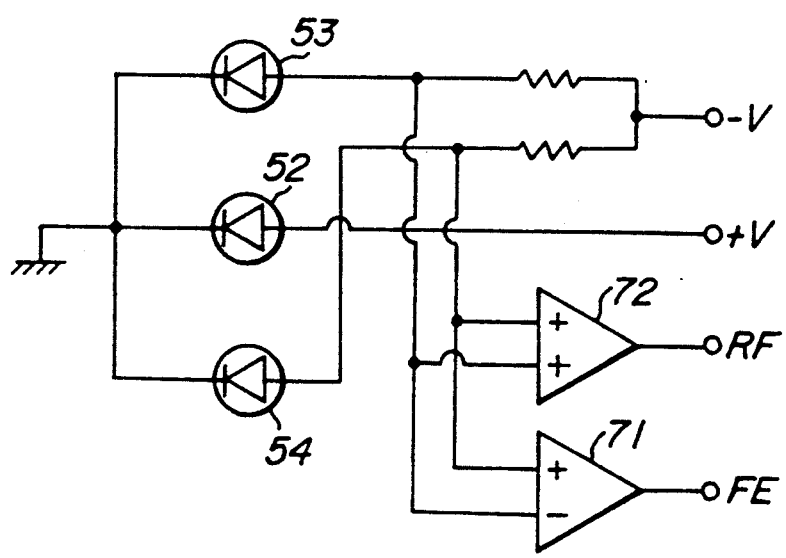

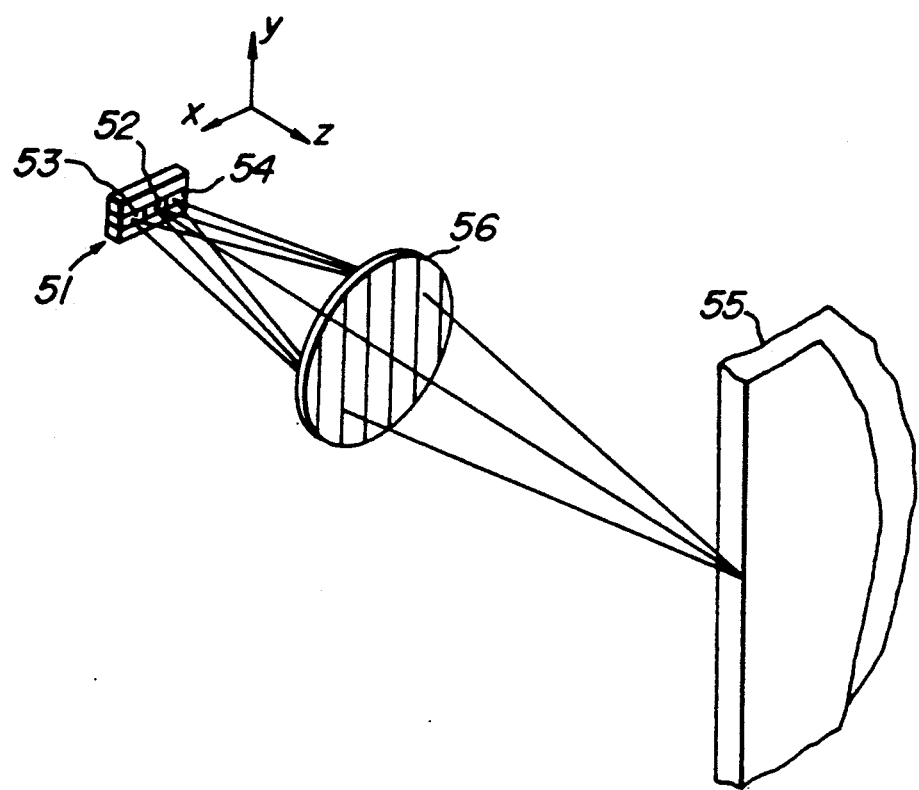
FIG_20

FIG_21
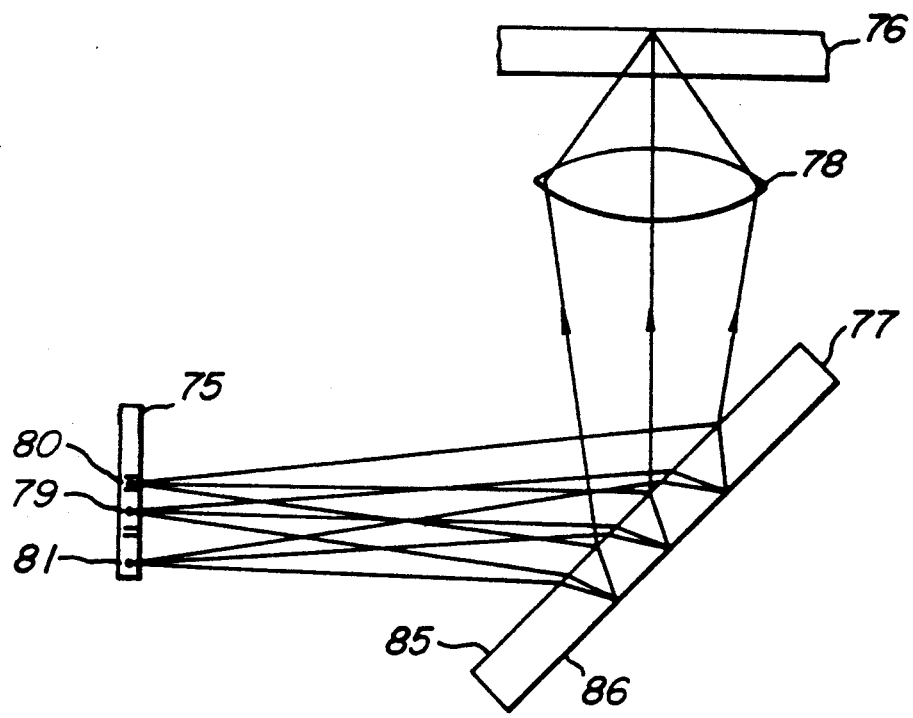
FIG_22
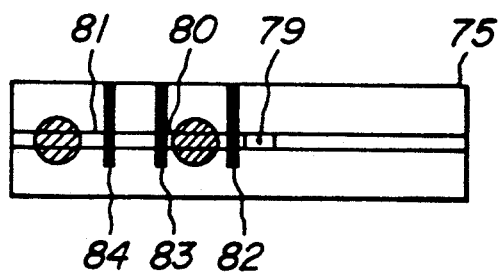

FIG._23
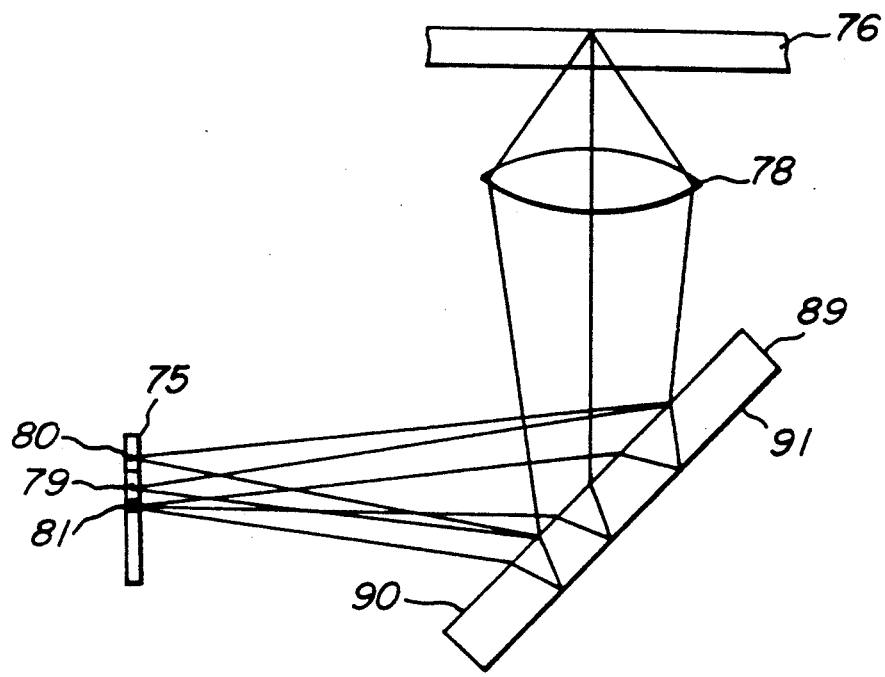
FIG._24A
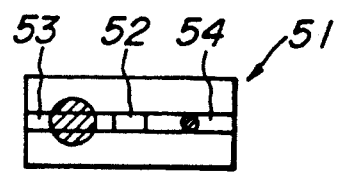
FIG._24B
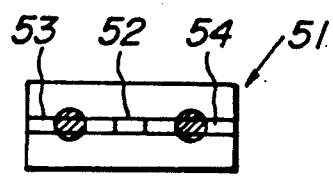
FIG._24C
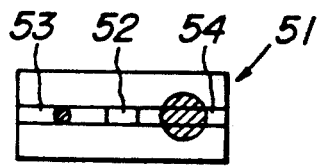

FOCUS ERROR DETECTING APPARATUS

BACKGROUND OF THE INVENTION

Field of the invention and related art statement

The present invention relates to a focus error detecting apparatus which is preferably applied to an apparatus for recording information in an optical information recording medium, such as an optical disc, an optical card and a photomagnetic disc, and/or for reproducing the information recorded in such optical information recording medium.

FIG. 1 is a schematic view showing a conventional focus error detecting apparatus. In the apparatus shown in FIG. 1, a laser beam emitted from a laser diode 1 is made incident upon an optical disc 2 via a lens 3, a polarizing beam splitter 4, a quarter-wave plate 5 and an objective lens 6; and a reflected light beam reflected by the optical disc 2 is introduced to a photodetector 7 via the objective lens 6, the quarter-wave plate 5, the polarizing beam splitter 4, a hologram element 8 and a lens 9.

FIG. 2 is a schematic view depicting a front surface of the photodetector 7. As depicted in FIG. 2, the photodetector 7 comprises a first pair of light receiving portions 10 and 11 for detecting a focusing error signal, a second pair of light receiving portions 12 and 13 for detecting tracking error signal and a third light receiving portion 14 for detecting information reproducing signal; and all of these light receiving portions are arranged in a same plane. The reflected light beam reflected by the optical disc 2 is separated into two light beams one of which is made incident upon the light receiving portion 12 and the other light beam is made incident upon the light receiving portion 13 by the hologram element 8 and the lens 9; and a zero-order diffraction light beam of the reflected light beam is made incident upon the light receiving portion 14; and ± first order diffraction light beams are made incident upon the light receiving portions 10 and 11, respectively.

It should be noted that the apparatus is so designed that each of the light beams being made incident upon the light receiving portions 12, 13 and 14 is focused on each light receiving surfaces of the light receiving portions, the plus first order diffraction light beam being made incident upon the light receiving portion 10 is focused on a former position of the light receiving surface of the light receiving portion 10 and the minus first order diffraction light beam being made incident upon the light receiving portion 11 is focused on a rear position of the light receiving surface of the light receiving portion 11. The light receiving portions 10 and 11 comprise three light receiving area 10A, 10B, 10C and 11A, 11B, 11C, respectively.

The focusing error signal is detected from outputs $10a$, $10b$, $10c$ of the light receiving area 10A, 10B, 10C and outputs $11a$, $11b$, $11c$ of the light receiving area 11A, 11B, 11C by applying the formula of $\{10a-(10b+10c)-[11a-(11b-11c)]\}$; the tracking error signal is derived from the difference of the outputs of the light receiving portions 12 and 13, and the information reproducing signal is derived from the output of the light receiving portion 14.

FIG. 3 is a schematic view showing another conventional focus error detecting apparatus. In the apparatus shown in FIG. 3, a laser diode 21 and a photodetector 22 are arranged in a same plane; a light beam emitted from the laser diode 21 is introduced to an optical disc 23 via a lens 24, a hologram element 25 and an objective lens 26; and a reflected light beam reflected by the optical disc 23 is made incident upon the photodetector 22 via the objective lens 26, the hologram element 25 and the lens 24.

FIG. 4 is a schematic view representing a front surface of the photodetector 22. In the photodetector 22, are provided a first pair of light receiving portions 27 and 28 for detecting the focusing error signal and the information reproducing signal and a second pair of light receiving portions 29 and 30 for detecting the tracking error signal. The reflected light beam reflected by the optical disc 23 is separated into two light beams one of which is made incident upon the light receiving portion 29 and the other light beam is made incident upon the light receiving portion 30 by the hologram element 25 and the lens 23; and the plus first-order diffraction light beam is separated into two light beams one of which is made incident upon the light receiving portion 27 and the other light beam is made incident upon the light receiving portion 28, respectively, by the hologram element 25 and the lens 24.

Each light beams introduced to the light receiving portions 29 and 30 is focused on each light receiving surfaces of light receiving portions; and the plus first order diffracting light beam introduced to the light receiving portion 27 is focused on a former position of the light receiving portion 27 and the plus first-order diffraction light beam introduced to the light receiving portion 28 is focused on a rear position of the light receiving portion 28. The light receiving portions 27 and 28 comprise three light receiving area 27A, 27B, 27C and 28A, 28B, 28C, respectively.

The focusing error signal is detected from the outputs $27a$, $27b$, $27c$ of the light receiving area 27A, 27B, 27C and the outputs $28a$, $28b$, $28c$ of the light receiving area 28A, 28B, 28C by applying the formula of $\{27a-(27b+27c)\}-\{28a-(28b-28c)\}$; the information reproducing signal is derived from the sum of the outputs of the light receiving portions 27 and 28; and the tracking error signal is derived from the difference between the outputs of the light receiving portions 29 and 30.

The apparatus shown in FIG. 1 has a advantage that the utilizing efficiency of the light beam is high and thus the focal point can be detected with a high degree of reliability. However, since the laser diode 1 and the photodetector 9 are independently arranged in different planes in this apparatus, the apparatus as a whole becomes large in size.

Contrary, in the apparatus shown in FIG. 3, the laser diode 21 and the photodetector 22 are arranged in a same plane, so that the size of the apparatus as a whole can be made compact. However, in this apparatus, since the focusing error signal is detected by the +first order diffraction light beam only, the utilizing efficiency of the light beam is not so high, and then the focus error can not be detected with a high responsibility.

In order to solve the above-mentioned problem, an apparatus having a construction shown in FIG. 5 can be suggested. In this apparatus, a laser diode 31 and two photodetectors 32, 33 for obtaining the focusing error signal are arranged in a same plane; the light beam emitted from the laser diode 31 is introduced to an optical disc 34 via a hologram element 35 and an objective lens 36; the reflected light beam reflected by the optical disc 34 is made incident upon the hologram element 35 via the objective lens 36 and ± first-order diffraction light beams are generated thereby. The ± first-order diffraction light beams ar made incident upon the photodetectors 32 and 33, respectively, such that the focusing positions of the diffraction light beams are deviated in front and in rear from the light receiving portions of the photodetectors 32 and 33; and the focusing error signal is derived from the difference between the outputs of the photodiodes 32 and 33. However, in the apparatus shown in FIG. 5, since the laser diode 31 and the photodetectors 32 and 33 are arranged independently, it is necessary to adjust the positions of the photodetectors 32 and 33 with respect to the laser diode 31 in a diffraction direction (x) of the diffraction light beam diffracted by the hologram element 35 and in a direction (y), which is perpendicular to the x direction, in addition to adjusting the position of the photodiodes 32, 33 in an optical axis direction (z). Therefore, the number of position adjusting process increases and the cost for manufacturing the apparatus becomes expensive.

In the apparatus shown in FIG. 5, when the wavelength λ of the laser beam emitted from the laser diode 31 is about 780 nm (±10 nm), the distance between the light incident points of the laser diode 31 and each of the light incident points of the ± first-order diffraction light beam being made incident upon the photodetectors 32 and 33 is about 0.4 mm, in order to limit a focusing offset to ±0.2 μm or less and limit a variation of focussing responsibility to 20% or less, the positioning accuracy shown in the below-mentioned table is required for the photodiodes 32 and 33 and the hologram element 35.

TABLE

| Parameter | | Tolerance |
|---|---|---|
| Photodetectors | $X_P$ | ±100 μm |
| | $Y_P$ | ±5 μm |
| | $Z_P$ | ±10 μm |
| | $\theta_P$ | ±0.5 deg |
| | $X_d$ | ±100 μm |
| | $Y_d$ | ±2 μm |
| Hologram element | $X_H$ | ±90 μm |
| | $Y_H$ | ±90 μm |
| | $Z_H$ | ±100 μm |
| | $\theta_H$ | ±0.5 deg | wherein:

$X_P$: deviation in x direction of photodiodes with respect to laser diode;

$Y_P$: deviation in y direction of photodiodes with respect to laser diode;

$Z_P$: deviation in z direction of photodiodes with respect to laser diode;

$\theta_P$: rotation deviation of photodiodes;

$X_d$: deviation in x direction between photodiodes;

$Y_d$: deviation in y direction between photodiodes;

$X_H$: deviation in x direction of hologram element;

$Y_H$: deviation in y direction of hologram element;

$Z_H$: deviation in z direction of hologram element;

$\theta_H$: rotation deviation of hologram element

These parameters except $Z_P$ and $Z_H$ are illustrated in FIGS. 6 to 9. It should be noted that the reference X in FIG. 8 represents the distance between the light incident points of the ± first-order diffraction light beams being made incident upon the photodetectors 32 and 33. In this case, the distance X is about 0.8 mm.

From the above-mentioned table, it is proved that the tolerances of the parameters $Y_P$, $Y_d$ and $Z_P$ are very strict when adjusting the position of the photodetectors 32 and 33.

The parameter $\theta_H$ of the hologram element 35 can be used to adjust the parameter $Y_P$ of the photodetectors. However, when adjusting the parameter $\theta_H$ of the hologram element 35, the spots of the ± first-order diffraction light beams move on the photodetectors 32, 33 as shown in FIG. 9. Thus, it is possible to adjust the parameter $\theta_H$ such that the one of the spots is positioned on one of the photodetectors 32 and 33, but the other spot can not be introduced on the other photodetector. Similarly, it is used to adjust the deviation $Y_d$ between the photodetectors in the y direction by adjusting the parameter $\theta_H$ of the hologram element 35. But it is not possible to introduce both of the spots of the ± first-order diffraction light beams just on the photodiodes 32 and 33, respectively. Further, the parameter $X_H$ of the hologram element 35 can be used to adjust the deviation $Z_P$ of the photodetectors 32 and 33 in the z direction with respect to the laser diode. But, when moving the hologram element 35 is moved in x direction, the movement of the spot of the plus first-order diffraction light beam is different from that of the spot of the minus first-order diffraction light beam, so that the deviations of the photodiodes 32 and 33 in z direction with respect to the laser diode 31 ($Z_P$) cannot be adjusted.

As explained in above in detail, in the apparatus having such a construction that the laser diode 31 and photodetectors 32 and 33 are independently arranged, and the ± first-order diffraction light beams diffracted by the hologram element 35 are received by the photodetectors 32, 33, which are arranged symmetrically with respect to the laser diode 31, it is not possible to adjust the positioning deviations of the photodiodes 32, 33 with respect to the laser diode 31 by using parameters of other element such as hologram element 35. Therefore, the photodiodes 32, 33 and the laser diode 31 must be positioned with a strictly high accuracy; and thus, the number of adjusting process is increases and the cost for manufacturing the apparatus becomes expensive.

Another apparatuses for detecting a focus error are disclosed in Japanese Patent Laid Open Publication Nos. 56-57013 and 63-10325. FIG. 10 is a schematic view representing the conventional apparatus disclosed in these publications. In the apparatus represented in FIG. 10, a light beam emitted from a laser diode 41 is reflected by a semi-transmitting surface 42a of a parallel plate 42 and converged by an objective lens 44 toward an optical disc 43 ; a reflected light beam reflected by the optical disc 43 is transmitted through the semi-transmitting surface 42a of the parallel plate 42 and is reflected by a reflecting surface 42b of the parallel plate 42; thereafter the light beam is made incident upon a photodetector 45 via the semitransmitting surface 42a.

When the reflected light beam reflected by the optical disc 43 is made incident upon the semitransmitting surface 42a from a perspective direction, an astigmatism is introduced into the reflected light beam due to the thickness of the parallel plate 42. In order to detect a variation of the light beam caused by the astigmatism, the photodetector 45 comprises four light receiving area 45A to 45D, as shown in FIG. 11. The focusing error signal and information reproducing signal are detected by the outputs 45a, 45b, 45c, 45d of the light receiving area 45A, 45B, 45C, 45D. That is to say, the focusing error signal is derived from the outputs 45a, 45b, 45c, 45d by applying the formula {(45a+45c)−(45b+45d)}; and the information reproducing signal is derived from the sum of the outputs 45a to 45d of the light receiving area 45A to 45D.

In this apparatus, since the laser diode 41 and the photodetector 45 are arranged separately, it is difficult to make the apparatus compact. Further, an error in size of the parallel plate 42 causes a problem that an optical axis of the reflected light beam being made incident upon the photodetector 45 is deviated from a desired position and thus the spot of the reflected light beam is not positioned on a center of the photodetector 45. That is to say, if there is no error in the thickness of the parallel plate 42, the center of the spot 46 of the reflected light beam is coincident with the intersection center of the dividing lines which divide the photodetector 45 as shown in FIG. 12A. However, if the thickness of the plate 42 is thinner than a given thickness, the center of the spot 46 is deviated from the intersection point of the dividing lines in an upper direction (laser diode 45 side) as shown in FIG. 12B; and if the thickness of the plate is thicker than the given thickness, the center of the spot 46 is deviated from the intersection point of the dividing lines in a lower direction as shown in FIG. 12C.

As stated above, when the optical axis of the reflected light beam is deviated from the desired position due to the error of the thickness of the parallel plate 42, it is necessary to adjust the position of the photodetector 45 with a strictly high accuracy of about 0.5 μm or less. Therefore, there is also the problem that the number of adjusting process increases and the cost for manufacturing the apparatus becomes high.

SUMMARY OF THE INVENTION

The present invention has for its object to provide a focus error detecting apparatus in which the positions of the optical elements constituting the apparatus can be adjusted easily and the focusing state thereof can be always detected with high accuracy. Further, according to the present invention, the cost for manufacturing the apparatus can be reduced and the size of the apparatus can be made compact.

In order to carry out the above-mentioned object, the focus error detecting apparatus according to the invention comprises:

a light emitting and receiving element comprising a common semiconductor substrate, a light emitting portion formed in said substrate and at least two light receiving portions formed in said substrate;

an optical means for introducing a light beam emitted from said light emitting portion of said light emitting and receiving element to an object, for diffracting a reflected light beam reflected by said object to generate plus and minus first-order diffraction light beams which are made incident upon said light receiving portions and for introducing astigmatism into the plus and minus first-order diffraction light beams such that shapes of spots of said diffraction light beams formed on said light receiving portions vary substantially reversely to each other; and a detection means for processing outputs of the light receiving portions of said light emitting and receiving element to detect a focus error of said optical means with respect to said object.

BRIEF DESCRIPTION OF THE DRAWINGS

FIG. 1 is a schematic view showing a construction of a conventional focus error detecting apparatus;

FIG. 2 is a schematic view depicting a front surface of a photodetector of the apparatus shown in FIG. 1;

FIG. 3 is a schematic view illustrating a construction of another conventional focus error detecting apparatus;

FIG. 4 is a schematic view representing a front surface of a photodetector of the apparatus depicted in FIG. 3;

FIG. 5 is a schematic view showing a construction of another conventional focus error detecting apparatus;

FIGS. 6 to 9 are schematic view depicting states of deviations in a hologram element and photodetectors of said apparatus shown in FIG. 5;

FIG. 10 is a schematic view illustrating a construction of another conventional focus error detecting apparatus;

FIGS. 11 and 12A to 12C are schematic views representing a front surface of a photodetector of the apparatus illustrated in FIG. 10.

FIG. 13 is a schematic view showing a construction of a first embodiment of a focus error detecting apparatus according to the present invention;

FIG. 16 is a perspective view representing a construction of an embodiment of the light emitting and receiving element shown in FIG. 13;

FIG. 17 is a graph showing a response characteristics of an active layer of a photo-detecting portion of the light emitting and receiving element shown in FIG. 13;

FIG. 18 is a circuit diagram denoting an embodiment of driving circuit and signal processing circuit for the light emitting and receiving element shown in FIG. 13

FIG. 20 is a schematic view illustrating a construction of a second embodiment of the apparatus according to the present invention;

FIG. 21 is a schematic view showing a construction of a third embodiment of the apparatus according to the present invention;

FIG. 22 is a large-scale schematic view depicting a front surface of a light emitting and receiving element of the apparatus shown in FIG. 21;

FIG. 23 is a schematic view illustrating a construction of a fourth embodiment of the apparatus according to the present invention;

FIGS. 24A to 24C ar schematic views representing front surfaces of light emitting and receiving elements of modifications of the apparatus according to the present invention;

DETAILED DESCRIPTION OF PREFERRED EMBODIMENTS

FIG. 13 is a schematic view showing a construction of the first embodiment of a focus error detecting apparatus according to the present invention.

Figure 15A:
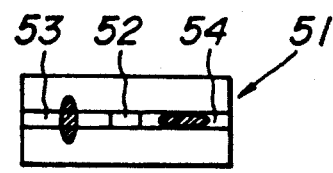
FIGS. 15A to 15C are schematic front views illustrating the light emitting and receiving element of the apparatus shown in FIG. 13.
Figure 15B:
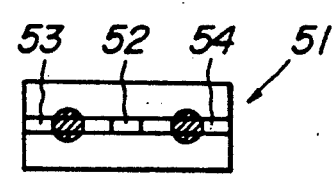
Figure 15C:
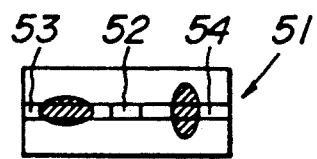

In this embodiment, the apparatus comprises a light emitting and receiving element 51 in which a laser diode 52 and photodetectors 53, 54 are integrally formed on a common semiconductor substrate. In this light emitting and receiving element 51, a light emitting surface of the laser diode 52 and a light receiving surface of the photodetectors 53, 54 exist in a same plane; the photodetectors 53 and 54 are arranged at both sides of the laser diode 52. A light beam emitted from the laser diode 52 is introduced onto an object 55 such as an optical disc via a hologram element 56 and an objective lens 57. A reflected light beam reflected by the optical disc 55 is made incident upon the hologram element 56 via the objective lens 57 to be diffracted. Plus and minus first-order diffraction light beams generated by the hologram element 56 are received by the photodetectors 53 and 54, respectively. The hologram element 56 is designed so as to give an astigmatism to the ± first-order diffraction light beams, and then the shapes of beam spots of the ±first-order diffraction light beams formed on the photodetectors 53, 54 vary in substantially reverse directions to each other. The variation of the shapes of the beam spots are shown in FIGS. 15A to 15C. The focusing state of the objective lens 57 with respect to the object 55 can be detected on the basis of outputs of the photodetectors 53, 54.

Figure 14:
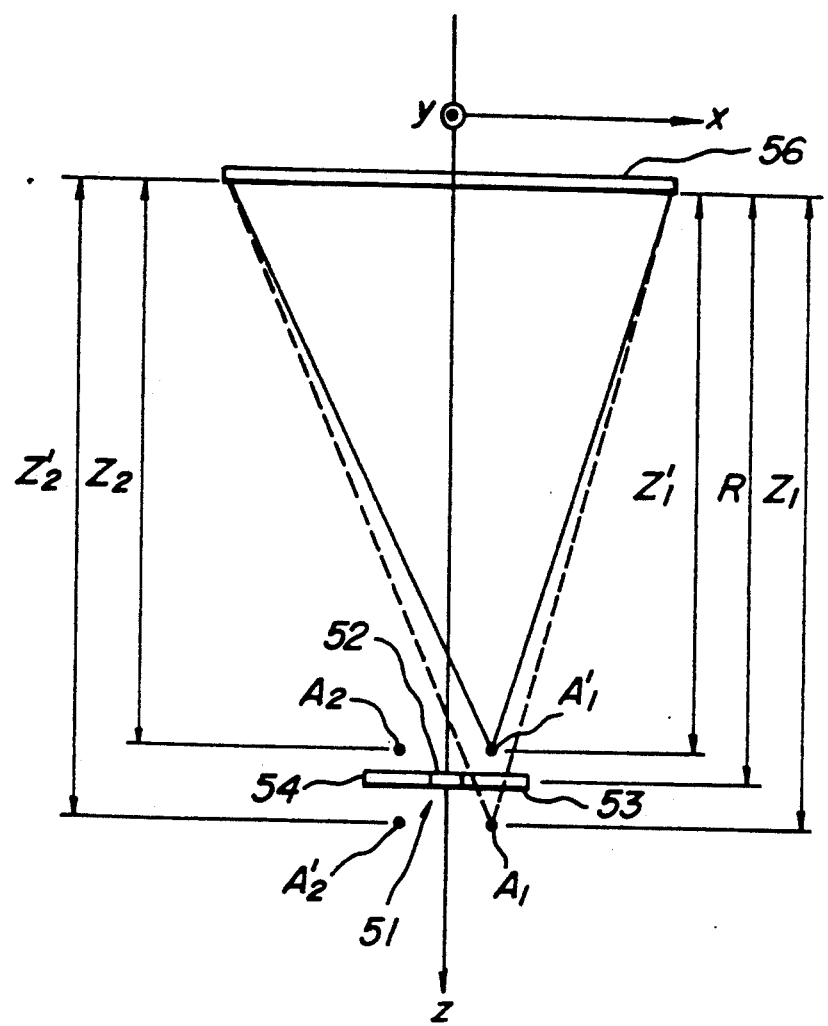
FIG. 14 is a schematic plan view denoting a hologram element and a light emitting and receiving element of the apparatus shown in FIG. 13.

As stated above, when the astigmatism is given to the ± first-order diffraction light beams by means of the hologram element 55, there exist two focal points $A_1$, $A_1'$ and $A_2$, $A_2'$ for the ± first-order diffraction light beams, as shown in FIG. 14. In FIG. 14, the points $A_1$ and $A_2$ represent focal points focused on a meridional image surface of the optical system and the points $A_1'$ and $A_2'$ represent focal points focused on a sagittal image Surface thereof. The focal points $A_1$, $A_2$ are conjugated with the focal points $A_1'$, $A_2'$, respectively, so that the focal points $A_1$, $A_1'$ and $A_2$, $A_2'$ are formed at opposite sides about an optical axis (z) of the optical system, respectively.

In FIGS. 13 and 14, the focal points $A_1$, $A_1'$, $A_2$ and $A_2'$ are positioned in diffracting directions defined by the hologram element 56, i.e. in an x-z plane defined by the x direction, in which the laser diode 52 and the photodetectors 53 and 54 are aligned, and the z direction (optical axis direction). In these figures, the direction perpendicular to the x and z direction is defined as the y direction. When distances between the hologram element 56 and the respective focal points $A_1$, $A_1'$, $A_2$, $A_2'$ in the z direction are represented by $Z_1$, $Z_1'$, $Z_2$, $Z_2'$ and the distance between the laser diode 52 and the hologram element 56 is represented by R, the following formulae are introduced:

$$1/Z_2 = 2/R - 1/Z_1 \quad (1)$$

$$1/Z_2' = 2/R - 1/Z_1' \quad (2)$$

Therefore, when the focal points $A_1$ and $A_1'$ are positioned so as to satisfy the condition $Z_1 > Z_1'$ as shown in FIG. 14, the conjugated images $A_2$, $A_2'$ of the focal points $A_1$ and $A_1'$ are positioned so as to satisfy the condition $Z_2 < Z_2'$. That is to say, the direction of the astigmatisms of the ± first-order diffraction light beams are opposite to each other.

It is clear from the above that when the light emitting surface of the laser diode 52 and the respective light receiving surfaces of the photodetectors 53, 54 are arranged between the focal points $A_1$ and $A_1'$ and between $A_2$ and $A_2'$ respectively, the shapes of the ± first-order diffraction light beams being made incident upon the photodetectors 53 and 54 are varied substantially reversely as shown in FIG. 15. That is to say, when the optical disc 55 is in focus with respect to the objective lens 57, the shapes of the ± first-order diffraction light beams become almost the same as each other as shown in FIG. 15B; when the optical disc 55 is advanced to the objective lens side from the focusing position, the shapes of the diffraction light beams vary as shown in FIG. 15A; and when the optical disc 55 is on the side of the focusing position opposite to the side on which the objective lens is positioned, the shapes of the diffraction light beams vary as illustrated in FIG. 15C. In other words, the shapes of the ±first-order diffraction light beams become almost the same when the optical disc 55 is in focus, but when the optical disc 55 is out of focus the shapes of the diffraction light beams vary in reverse directions to each other in accordance with the direction of the focusing deviation. Therefore, the focusing error signal representing the focusing condition of the objective lens 57 with respect to the optical disc 55 can be obtained from the difference between outputs of the photodetectors 53 and 54.

FIG. 16 is a perspective view illustrating an embodiment of the structure of the light emitting and receiving element 51. The light emitting an receiving element 51 comprises a semiconductor substrate 61 made of GaAs. On the substrate 61, are provided the laser diode 52 and the photodetectors 53 and 54. The photodetectors 53, 54 are arranged at both sides of the laser diode 52. The laser diode 52 has a strip-type double-hetero structure (DH structure). That is to say, on an upper surfaces of the substrate 61 is provided a lamination layer comprising a clad layer 62a of n-type Ga1-XAlXAs, an activated layer 63a of GaAs, a clad layer 64a of p-type Ga1-XAlXAs, a p-type GaAs layer 65a, an oxide film 66 having a stripe structure and a metal electrode 67a, in this order; and on a rear surface of the substrate 61 is arranged other metal electrode 68 which is commonly used to the photodetectors 53 and 54 and the laser diode 52. In the laser diode 52, an optically parallel Fabry-Perot reflection mirror is arranged in a direction perpendicular to the p-n junction surface of the lamination layer by utilizing cleavage surfaces of crystals constituting the clad layers 62a and 64a; and there is provided the DH structure, in which the activated layer 63a is sandwiched by the clad layers 62a and 64a, to obtain both a carrier confining effect and a light confining effect. This laser diode 52 is typical gain waveguide type, so that the active layer 63a has no refractive index distribution in a lateral direction. A thickness of the active layer 63a is about 1.0–0.5 μm, and those of the clad layers 62a and 64a are about 1~2 μm, respectively. The p-type GaAs layer 65a is arranged on the clad layer 64a for making easy to pick up the metal electrode. And the oxide film 66 has a strip structure which is for partially flowing an electric current therethrough to obtain a single basic lateral mode. The voltage in a forward direction of the laser diode 51 is about 2[V]; and the breakdown voltage thereof is about 10~50[V].

The photodetectors 53 and 54 are formed on the common substrate 61 and electrically isolated from the laser diode 52 by grooves 69 and 70. These grooves 69 and 70 are formed by etching so as to be extended from the upper surface of the light emitting and receiving element 51 to the substrate 61. It should be noted that the photodetectors do not have the oxide film 66 having a strip structure through which an electrical current is partially flowed, but the other structure is almost same as that of the laser diode. Therefore, the photodetectors 53, 54 and the laser diode 52 can be formed on the substrate 61 simultaneously.

When the wavelength of the laser beam emitted from the laser diode 51 is varied, for example, due to a temperature variation, the ± first-order diffraction light beams generated by the hologram element 56 are varied in the x direction. Thus, if each of the active layers 63b, 63b of the photodetectors 53, 54 has a confined structure like that of the laser diode 52, the sensitivity of the active layers 63b, 63b of the photodetectors 53 and 54 would vary in accordance with the variation of the wavelength of the laser beam, as shown by a line A in FIG. 17. Therefore, in the active layers 63b, 63b of the photodetectors 53, 54 is not provided strip structured oxide film. The line B in FIG. 17 represents the sensitivity of the active layers 63b, 63b of the photodetectors 53, 54 in case the active layers 63b, 63b does not have the confined structure. As clear from this line B, the sensitivities of the active layers 63b, 63b of the photodetectors 53, 54 are uniform in the x direction. Therefore, even if the wavelength of the laser light beam emitted from the laser diode 51 is varied due to the temperature variation, it is possible to obtain a uniform sensitivity for detecting a focus error.

It should be noted that a process for manufacturing the light emitting and receiving element mentioned above, laser oscillating characteristic and photodetecting characteristics thereof are stated on a paper "Monosilicly integrated GaALAs laser/detector array" (Denshi Tsushin Gakkai QOE 86-1 14, pp73 77, 1986.4.21).

FIG. 18 is a circuit diagram of the focal point detecting system according to the present invention. As shown in FIG. 18, to the laser diode 52 of the light emitting and receiving element 51 applied a forward direction voltage so that a laser light beam is emitted from the laser diode 52, and to the photodetectors 53 and 54 are applied reverse direction voltages so that the photodetectors 53 and 54 serve as photodiodes. The outputs of the photodetectors 53 and 54 are supplied to a differential amplifier 71 to derive a focusing error signal representing a focusing state of the objective lens 57 with respect to the optical disc 55. In case of reading out information recorded in said optical disc 55 by utilizing the reflected light beam reflected by the optical disc 55, the outputs of the photodetectors 53, 54 should be supplied to an adder 72 to obtain an information reproducing signal.

Figure 19:
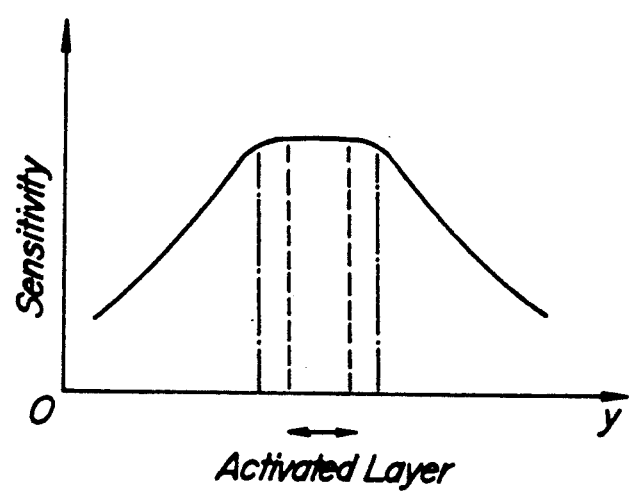
FIG. 19 is a graph representing a responsibility characteristics of the photo detecting portion in a thickness direction.

FIG. 19 is a graph representing a sensitivity characteristic in a thickness direction, i.e. y direction, of the photodetectors 53, 54 formed on the substrate 61, which is commonly used to the laser diode 52. It should be noted that the sensitivity characteristics can be controlled to some degree by controlling the reverse direction voltage applied to the photodetector 53, 54.

As stated above, in this embodiment, a laser diode 52 and the photodetectors 53 and 54 are formed on the commonly used semiconductor substrate. Therefore, it is not necessary to adjust the positions of the photodetectors 53, 54 with respect to the laser diode 51, and thus the number of process for adjusting the optical elements can be greatly decreased and the cost for manufacturing the apparatus can be make cheep. Also, in this embodiment, since the light receiving sensitivities of the photodetectors 53 and 54 are substantially uniform in the diffracting direction of the diffracted light beams generated by the hologram element 56, it is always possible to detect the focusing condition with a uniform sensitivity even when the wavelength of the laser light emitted from the laser diode 51 is varied due to the temperature variation. Therefore, it is always possible to detect the focal point with a high accuracy.

FIG. 20 is a schematic view showing a second embodiment of the focus error detecting apparatus in accordance with the present invention. In this embodiment, the hologram element 56, which also has a function for converging the laser beam emitted from the laser diode 52, is used to introduce the light beam on the surface of the optical disc 55. The other construction is the same as that of the first embodiment. In the second embodiment, not only the construction of the apparatus as a whole can be made simple but also the weight of the apparatus can be greatly decreased. Further to the above, since the weight of the light emitting and receiving element 51 and the hologram element 56 can be decreased, it is possible to move these elements 51 and 56 as a single body by a focusing servo mechanism in accordance with the focusing error signal. Therefore, a construction of a driving apparatus for driving the elements 51 and 56 can be made simple and the cost for manufacturing the driving apparatus can be made low.

FIG. 21 is a schematic view depicting a third embodiment of the focus error detecting apparatus in accordance with the present invention. In this embodiment, a reflection-type hologram element is applied instead of the transmission-type hologram element, which is applied in the first and second embodiments. A light beam emitted from a light emitting and receiving element 75 is projected to an optical disc 76 via a hologram element 77 and an objective lens 78; and a reflected light beam reflected by the optical disc 7 is received by the light emitting and receiving element 75 via the objective lens 77 and the hologram element 75. It should be noted that the hologram element is arranged to be inclined about 45° with respect to an optical axis of the objective lens 78.

The light emitting and receiving element 75 comprises a laser diode 79 and photodetectors 80 and 81, which are formed on a commonly used substrate in this order; and the photodetectors 80 and 81 are electrically isolated from each other and from the laser diode 79 by grooves 82, 83 and 84 as shown in FIG. 22. Further, the hologram element 77 comprises a transparent parallel plate having a first surface 85 which serves as a half-mirror and a second surface 86 which comprises a reflection-type hologram surface.

In this embodiment, the laser beam emitted from the laser diode 79 is made incident upon the first surface 85 and is reflected to the objective lens 78 thereby; the reflected light beam reflected by the first surface 85 is converged by the objective lens 78 to be introduced on the optical disc 76; the reflected light beam reflected by the optical disc 76 is made incident upon the second surface 86 of the parallel plate 77 via the objective lens 78 and the first surface 85; and the ± first-order diffraction light beams having an astigmatism are generated by the second surface 86. These ± first-order diffraction light beams are made incident upon the photodetectors 80 and 81 formed on the light emitting and receiving element 75 via the first surface 85. The astigtisms given to the ± first-order diffraction light beams serve to vary the shapes of the beams in substantially reverse directions to each other. In this embodiment, the optical path of the light beam emitted from the laser diode 79 and introduced to the optical disc 76 is different from that of the reflected light beam reflected by the optical disc 76 and introduced to the photodetectors 80 and 81. That is to say, the light beam emitted from the laser diode 79 and introduced to the object 76 is reflected by the first surface 85 of the hologram element 77 and the reflected light beam reflected by the object 76 and then introduced to the photodetectors 80, 81 is reflected by the second surface 86 of the hologram element 77. Therefore, it is possible to greatly decrease an amount of stray light being made incident upon the photodiodes 80, 81. That is to say, the stray light is emitted from the laser diode 79, transmitted through the first surface 85 of the hologram element 77, reflected by the second surface 86, transmitted through the first surface 85 to be made incident upon the objective lens 78, and made incident upon the optical disc 76 and reflected thereby; and the reflected light beam reflected by the optical disc 76 is made incident upon the first surface 85 via the objective lens 78; then the transmitted through the first surface 85, reflected by the second surface 86, reflected by the first surface 85 and the second surface 86, and then transmitted through the first surface 85 to be introduced to the photodetectors 80, 81. Since the optical path of this stray light is different from that of the light which is actually used for detecting the signals such as focusing error signal, the size of the spot of the stray light is sufficiently large in comparison with the size of the spot of light beams for use in signal detecting. Furthermore, the stray light is reflected by the half-transmitting surface (first surface of the hologram element 77) two times more than the light for use in signal detecting. Therefore, the amount of the stray light can be decreased, so that the noise component of the focal point detecting signal becomes small.

In the third embodiment, if the astigmatism caused by the thickness of the hologram element 77 is large, this astigmatism has a bad influence on the focal point detection sensitivity. Therefore, it is preferable to make the thickness of the hologram element 77 thin, so that the astigmatism caused by the thickness of the hologram element 77 becomes sufficiently smaller than the astigmatism generated by the reflection-type hologram surface of the second surface 86.

FIG. 23 is a schematic view illustrating the fourth embodiment of the present invention. In this embodiment, the hologram element 89 comprises a transparent parallel plate which is arranged to be inclined to about 45° with respect to an optical axis of the objective lens; a first surface 90 thereof has a reflection-type hologram layer and the first surface 90 serves as a half mirror; and a second surface 91 serves as a mirror. The other construction is the same as that of the third embodiment.

In this embodiment, a light beam emitted from the laser diode 79 of the light emitting and receiving element 75 is refracted to the second surface 91 by the first surface 90; and the light beam is reflected by the second surface 91 and is refracted toward the objective lens 78 by the first surface 90; and the light beam is converged by the objective lens 78 and introduced on the surface of the optical disc 76. The reflection light beam reflected by the optical disc 76 is made incident upon the first surface 90 via the objective lens 78, and then diffracted and reflected by the first surface 90 of the hologram element 89. The ± first-order diffraction light beams each having an astigmatism are generated by the hologram element 89 and are made incident upon the photodetectors 80, 81 of the light emitting and receiving element 75.

The hologram pattern formed on the first surface 90 of the hologram element 89 is designed such that the diffracting efficiency of the hologram element 89 for light transmitted by the first surface 90 becomes sufficiently smaller than that for light reflected through the first surface 90. The respective ± first-order diffraction light beams ar given astigmatisms by the hologram surface 90 such that the shapes of the light beams being made incident upon the photodetectors 80 and 81 vary in reverse directions as well as the other embodiment described above.

In this embodiment, the optical path of the light beam emitted from the laser diode 81 and introduced to the optical disc 76 is deviated from that of the reflected light beam reflected by the optical disc 76 and introduced on the photodetectors 80 and 81 by giving a difference between the first and second reflecting surfaces of the hologram element 89 the same in the third embodiment. Therefore, the amount of stray light being made incident upon the photodetectors 80, 81 can be greatly decreased, and thus, it is possible to effectively prevent any decrease in the sensitivity for detecting the focus error. If the astigmatism caused by the thickness of the hologram element 89 is large, the astigmatism would make an influence with the sensitivity for the focal point detection. Therefore, it is preferable to make the hologram element thin such that the astigmatism caused by the thickness of the hologram element becomes sufficiently smaller than the astigmatism caused by the reflection-type hologram surface of the first surface 90 of the hologram element 89.

As stated above, the light beam spots formed on the photodetectors 80 and 81 ar moved due to the error of the thickness of the hologram elements 76 and 89. However, in this embodiment, since the moving directions of the light beam spots coincide with directions for dividing the photodetectors 80 and 81, the movements of the light beam spots caused by the error of the thickness of the hologram elements 79 and 89 do not have a bad influence on detection of the focal point.

The present invention is not limited by the above-mentioned embodiments, and many variations and alterations can be applied therefor. For instance, in the above-mentioned embodiment, the astigmatism is given to the ± first-order diffraction light beams by means of the hologram element, but it may be possible to design the apparatus such that positive and negative powers are introduced into the ± first-order diffraction light beams to deviate the imagery or focal points of the ± first-order diffraction light beams generated by the hologram element forwardly and backwardly from the light receiving portion of the light emitting and receiving element, with and the focusing state being detected by a beam size method. In this case, the size of spots of the ± first-order diffraction light beams are substantially equal to each other under the focusing state, as shown in FIG. 24B; when the object is advanced toward the hologram element in a forward direction, the size of the spot of the plus first-order diffraction light beam becomes small but that of the spot of the minus first-order diffraction light beam becomes large as shown in FIG. 24A; and when the object is out of focusing and retracted from the hologram element in a rearward direction, the relationship concerning the size of the light beam spots is reversed as shown in FIG. 24C. Therefore, the focusing state is always detected with a high accuracy from the difference between the outputs of the photodetectors 53 and 54.

Figure 26:
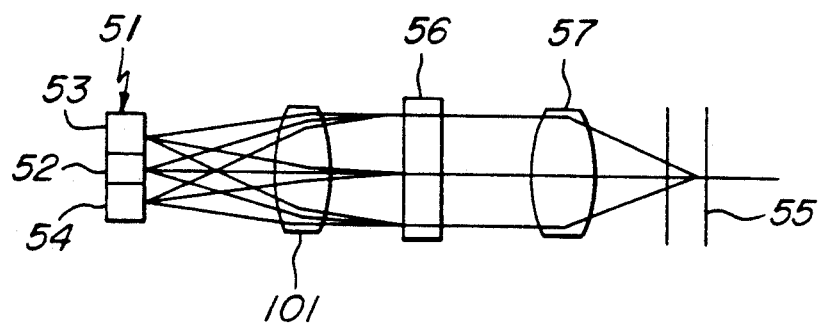
FIGS. 26 and 27 are embodiments wherein the optical system according to the first and second embodiments respectively include a collimator lens positioned between the hologram element and the light emitting-/receiving element.
Figure 27:
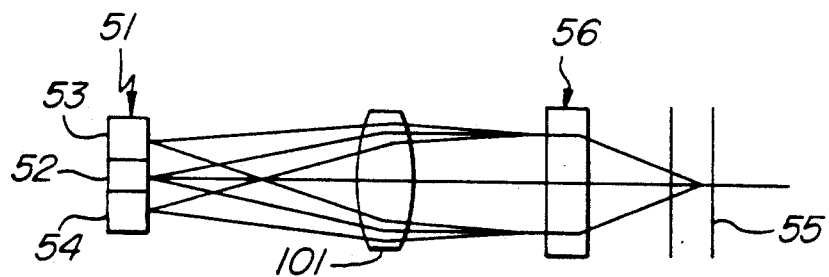
Figure 28:
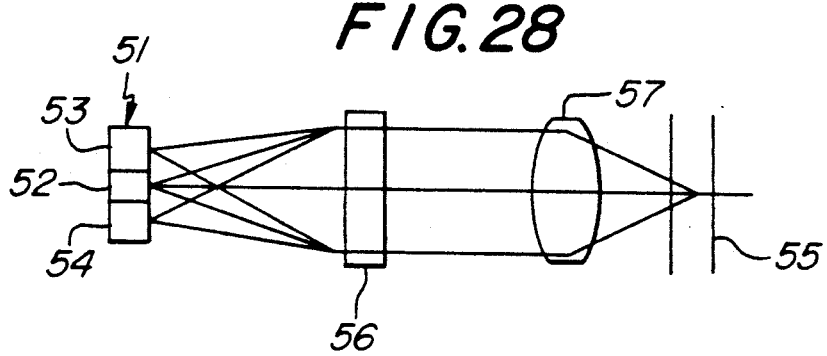
FIG. 28 illustrates an embodiment wherein the optical system according to the second embodiment is modified to constitute an infinite system.
Figure 29:
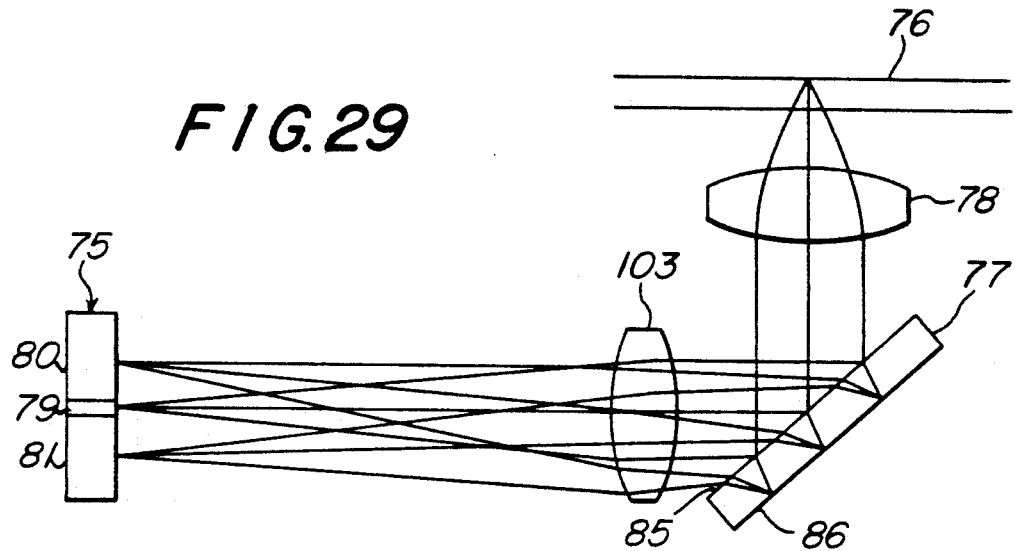
FIGS. 29 and 30 are embodiments wherein the optical system according to the third and fourth embodiments respectively include a collimator lens positioned between the hologram element and the light emitting-/receiving element.
Figure 30:
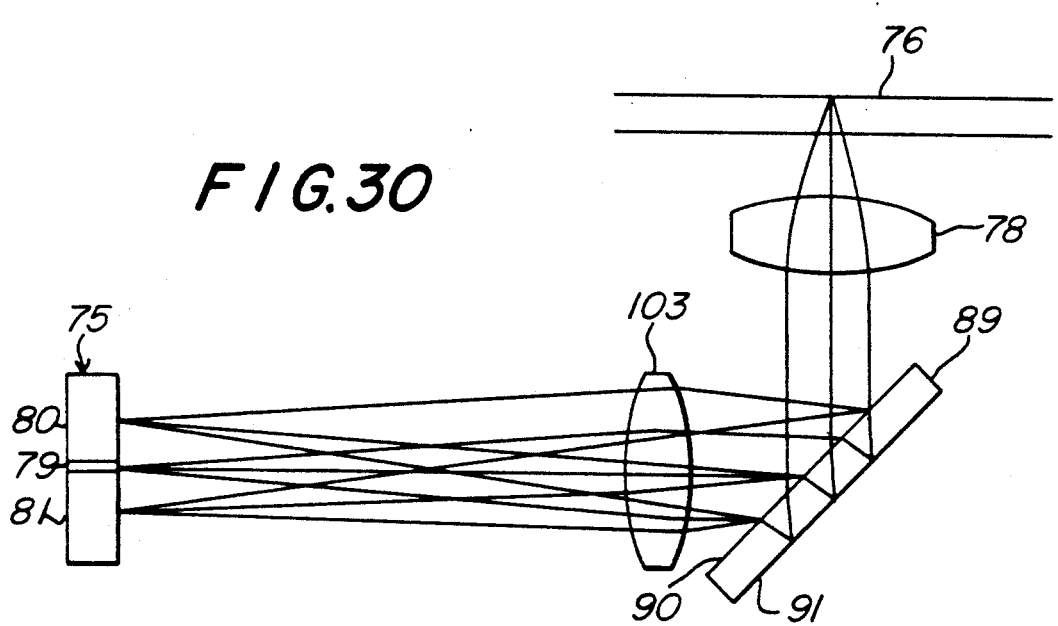

Further, in the first, third and fourth embodiments, a finite-system objective lens is used; and in the second embodiment, the hologram element is designed so as to have a function of the finite-system objective lens; but it is possible to arrange a collimator lens between the hologram element and the light emitting and receiving element to make the optical system infinite (see FIGS. 26-28).

FIGS. 26, 27, 29 and 30 are embodiments in which the optical system of the focus error detecting apparatus according to the first through fourth embodiments of the invention are modified to include a collimator lens located between the hologram element and the light receiving/detecting element so as to constitute an infinite system. FIG. 28 shows an alternative embodiment in which the optical system of the focus error detecting apparatus according to the second embodiment of the invention is modified to constitute an infinite system. In the FIG. 27 embodiment, a collimator lens is arranged in front of the hologram element. In the embodiment shown in FIG. 28, the hologram element has a function as a collimator lens, and an objective lens is arranged in back of the hologram element.

Furthermore, in the embodiments described in the above, a typical gain waveguide type laser diode, whose active layer has no refractive index distribution in a lateral direction, is used for the light emitting and receiving element; but a refractive index waveguide type laser diode, whose active layer has a refractive index distribution in a lateral direction, may be used to confine light. And a distributed feed back (DFB) laser diode, by which the wavelength of the oscillated laser beam is not varied in accordance with the electric current, can be used therefor. In this case, if the laser beam is modulated by a high frequency, the spectrum of the beam is not expanded and thus it is possible to oscillate the laser beam in single longitudinal mode. A distributed refraction type laser diode (DBR) also can be used therefor.

Moreover, a silicon substrate may be used for the GaAs substrate of the light emitting and receiving element. In this case, the peripheral circuit such as a pre-amplifier may be integrally formed on the silicon substrate to make the construction of the apparatus simple. Furthermore, p-type semiconductor substrate may be used for the n-type semiconductor substrate; but in this case the polarity of the applied voltage shown in FIG. 18 should be reversed.

The shape of the hologram element may be a wedged plate or a curved plate having a rotational elliptical surface or a parabolic surface.

Figure 25:
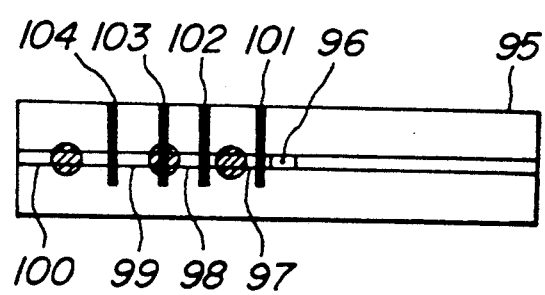
FIG. 25 is a schematic view showing a front surface of light emitting and receiving element of another modification of the apparatus according to the present invention.

Furthermore, the light emitting and receiving element of the apparatus according to the third and fourth embodiments may by varied in the following manner, i.e., such that a laser diode 96 is formed on the center portion of the semiconductor substrate and photodetectors 97 to 100 are formed at one side of the laser diode in order; the laser diode 96 and the photodetectors 97~100 are electrically isolated from each other by arranging grooves 101~104 as shown in FIG. 25; and the ± first-order diffraction light beams are made incident upon the photodiodes 97 and 100, which are arranged outside, and the zero-order diffraction light beam is made incident upon the photodetectors 98 and 99, which are arranged inside so as to be two light beams. In this construction, the focusing error signal may be obtained from the difference between the outputs of the photodiodes 97 and 100 and the tracking error signal may be derived from the outputs of the photodetectors 98 and 99 by a push-pull method.

What is claimed is:

1. A focus error detecting apparatus comprising:
   a light emitting and receiving element comprising a laminated semiconductor layer formed on a common semiconductor substrate, a light emitting portion formed in said laminated semiconductor layer and at least two light receiving portions formed in said laminated semiconductor layer;
   an optical means for introducing a light beam emitted from said light emitting portion of said light emitting and receiving element onto an object, for diffracting a reflected light beam reflected by said object to generate plus and minus first-order diffraction light beams which are caused to impinge upon said light receiving portions and for introducing astigmatism into the plus and minus first-order diffraction light beams such that shapes of spots of said plus and minus first order diffraction light beams formed on said light receiving portions have dimensions which vary in substantially opposite directions to each other when said object is moved from one side to another of a focus position of said optical means; and
   a detection means for processing outputs of the light receiving portions of said light and receiving element to detect a focus error of said optical means with respect to said object.

2. A focus error detecting apparatus comprising:
   a light emitting and receiving element comprising a common semiconductor substrate, a light emitting portion formed in said substrate and at least two light receiving portions formed in said substrate;
   an optical means for introducing a light beam emitted from said light emitting portion of said light emitting and receiving element onto an object, for diffracting a reflected light beam reflected by said object to generate plus and minus first-order diffraction light beams which are caused to impinge upon said light receiving portions and for introducing positive and negative powers into the plus and minus first-order diffraction light beams, respectively, such that focal points of said plus and minus first-order diffraction light beams in an in-focus condition are positioned forwardly and backwardly of said light receiving portions, respectively; and
   a detection means for processing outputs of the light receiving portions of said light emitting and receiving element to detect a focus error of said optical means with respect to said object.

3. A focus error detecting apparatus according to claim 1 or 2, wherein:
   said optical means comprises a hologram element which converges said light beam emitted from the light emitting and receiving element onto the object as a light spot, and diffracts the reflected light beam reflected by said object to generate the plus and minus first-order diffraction light beams.

4. A focus error detecting apparatus according to claim 3, wherein:
said hologram element is transmission-type.

5. A focus error detecting apparatus according to claim 3, further comprising a focusing servo mechanism for moving said light emitting and receiving element and said hologram element as a single body in accordance with said detected focus error.

6. A focus error detecting apparatus according to Claim 3, wherein:
said optical means further comprises a collimator lens arranged between said hologram element and said light emitting and receiving element.

7. A focus error detecting apparatus according to Claim 1 or 2, wherein:
said optical means comprises an objective lens which converges the light beam emitted from said light emitting and receiving element toward the object; and a hologram element which diffracts said reflected light beam reflected by said object to generate the plus and minus first-order diffraction light beams.

8. A focus error detecting apparatus according to Claim 7, wherein:
said hologram element is transmission-type.

9. A focal point detecting apparatus according to Claim 7, wherein:
said hologram element reflects said light beam emitted from said light emitting and receiving element.

10. A focal point detecting apparatus according to Claim 9, wherein:
said hologram element comprises a planar plate, a first surface which serves as a half mirror and reflects the light beam emitted from said light emitting and receiving element toward the objective lens; and a second surface which comprises a reflection-type hologram layer by which the reflected light beam reflected by said object is diffracted to generate the plus and minus first-order diffraction light beams.

11. A focus error detecting apparatus according to claim 10, wherein:
said hologram element is inclined by about 45° with respect to an optical axis of the objective lens.

12. A focal error detecting apparatus according to claim 10, wherein:
said optical means further comprises a collimator lens arranged between said hologram element and said light emitting and receiving element.

13. A focal point detecting apparatus according to claim 9, wherein:
said hologram element comprises a planar plate, a first surface which comprises a reflection-type hologram layer and a second surface which comprises a mirror surface; and said first and second surfaces are constructed such that the light beam emitted from said light emitting sand receiving element is refracted by the first surface, is reflected by said second surface, and then is refracted by said first surface, and the reflected light beam reflected by said object is diffracted by said first surface to generate the plus and minus first-order diffraction light beams.

14. A focus error detecting apparatus according to claim 13, wherein:
said hologram element is inclined by about 45° with respect to an optical axis of the objective lens.

15. A focal point detecting apparatus according to claim 13, wherein:
said reflection-type hologram layer of said first surface of said hologram element is constructed such that a diffraction efficiency of said hologram layer for light transmitted through the hologram layer is sufficiently smaller than that for light reflected by said hologram layer.

16. A focal error detecting apparatus according to claim 13, wherein:
said optical means further comprises a collimator lens arranged between said hologram element and said light emitting and receiving element.

17. A focal point detecting apparatus according to claim 1 or 2, wherein:
said light emitting portion of the light emitting and receiving element is separated from said first and second light receiving portions which are arranged on opposite sides of said light emitting portions.

18. A focus error detecting apparatus according to Claim 17, wherein:
said light emitting portion and said light receiving portions of the light emitting and receiving element are separated by grooves extending from an upper surface of the light emitting and receiving element to the common substrate.

19. A focus error detecting apparatus according to Claim 18, wherein:
said light emitting and receiving element comprises a rear surface electrode formed on a rear surface of said common semiconductor substrate and upper surface electrodes formed on respective upper surfaces of said light emitting portion and light receiving portions; said light emitting portion of the light emitting and receiving element comprises a active layer sandwiched by clad layers and an oxide film; said oxide film comprises a strip structure between said upper surface electrode of said light emitting portion and said on of the clad layers; and each of said light receiving portion comprises an active layer sandwiched by clad layers, said active layer and clad layers are formed simultaneously with said active layer and clad layers of said light emitting portion.

20. A focus error detecting apparatus according to claim 1 or 2, wherein:
said light receiving portions comprise first, second, third and fourth light receiving portions which are arranged on one side of light emitting portion and said light emitting portion of the light emitting and receiving element is separated from said first, second, third and fourth light receiving portions; said first and second light receiving portions are positioned to receive the plus and minus first-order diffraction light beams, respectively, and the third and fourth light receiving portions are positioned to receive a zero-order diffraction light beam of said reflected light beam reflected by said object.

21. A focus error detecting apparatus according to claim 20, wherein:
said light emitting portion and said light receiving portions of the light emitting and receiving element are separated by grooves extending from an upper surface of the light emitting and receiving element to the common substrate.

22. A focus error detecting apparatus according to claim 21, wherein:

said light emitting and receiving element comprises a rear surface electrode formed on a rear surface of said common semiconductor substrate and upper surface electrodes formed on respective upper surfaces of said light emitting portion and light receiving portions; said light emitting portion of the light emitting and receiving element comprises an active layer sandwiched by clad layers and an oxide film; said oxide film comprises a strip structure between said upper surface electrode of said light emitting portion and said one of the clad layers; and each of said light receiving portion comprises an active layer sandwiched by clad layers, said active layer and clad layers are formed simultaneously with said active layer and clad layers of said light emitting portion.

23. A focus error detecting apparatus comprising:

a light emitting and receiving element comprising a laminated semiconductor layer formed on a common semiconductor substrate, a light emitting portion formed in said laminated semiconductor layer and at least two light receiving portions formed in said laminated semiconductor layer;

an optical means for introducing a light beam emitted from said light emitting portion of said light emitting and receiving element onto an object, for diffracting a reflected light beam reflected by said object to generate plus and minus first-order diffraction light beams which are caused to impinge upon said light receiving portions, and for introducing positive and negative powers to said plus and minus first-order diffraction light beams, said powers of the diffraction light beams being reversed with respect to each other relative to forward and rearward positions of said diffraction light beams from a focused state on said light receiving portions; and a detection means for processing outputs of the light receiving portions of said light emitting and receiving element to detect a focus error of said optical means with respect to the object.

24. A focus error detecting apparatus according to claim 23, wherein:

said optical means comprises a hologram element which converges said light beam emitted from the light emitting and receiving element onto the object as a fine light spot and diffracts the reflected light beam reflected by said object to generate said plus and minus first-order diffraction light beams.

25. A focus error detecting apparatus according to claim 24, wherein:

said hologram element is a transmission-type element.

* * * * *